US012141064B2

(12) United States Patent
Wasserman et al.

(10) Patent No.: US 12,141,064 B2
(45) Date of Patent: Nov. 12, 2024

(54) USING A CONTAINER IMAGE TO DETERMINE A CACHING ALGORITHM FOR A SOFTWARE APPLICATION

(71) Applicant: Red Hat, Inc., Raleigh, NC (US)

(72) Inventors: Orit Wasserman, Mitzpe Aviv (IL); Gabriel Zvi BenHanokh, Tel-Aviv (IL); Yehoshua Salomon, Kfar Saba (IL)

(73) Assignee: Red Hat, Inc., Raleigh, NC (US)

( * ) Notice: Subject to any disclaimer, the term of this patent is extended or adjusted under 35 U.S.C. 154(b) by 29 days.

(21) Appl. No.: 17/538,475

(22) Filed: Nov. 30, 2021

(65) Prior Publication Data

US 2023/0169002 A1 Jun. 1, 2023

(51) Int. Cl.
*G06F 12/0815* (2016.01)
*G06F 9/48* (2006.01)
*G06F 12/0862* (2016.01)

(52) U.S. Cl.
CPC ........ *G06F 12/0815* (2013.01); *G06F 9/4843* (2013.01); *G06F 12/0862* (2013.01); *G06F 2212/1008* (2013.01)

(58) Field of Classification Search
None
See application file for complete search history.

(56) References Cited

U.S. PATENT DOCUMENTS

| | | | |
|---|---|---|---|
| 9,594,687 B2 | 3/2017 | Yoo et al. | |
| 10,936,352 B2 * | 3/2021 | Soman | G06F 9/45558 |
| 10,977,081 B2 | 4/2021 | Mandagere et al. | |
| 11,561,706 B2 * | 1/2023 | Mulholland | G06F 3/061 |
| 2008/0256304 A1 * | 10/2008 | Kezuka | G06F 3/0659 711/E12.001 |
| 2013/0232215 A1 | 9/2013 | Gupta et al. | |
| 2018/0157536 A1 * | 6/2018 | Jiang | G06F 9/5027 |
| 2018/0246812 A1 * | 8/2018 | Aronovich | G06F 12/0871 |
| 2019/0028490 A1 * | 1/2019 | Chen | H04L 63/1416 |
| 2020/0034167 A1 * | 1/2020 | Parthasarathy | G06F 9/45558 |
| 2021/0072893 A1 | 3/2021 | Singh et al. | |
| 2021/0149571 A1 * | 5/2021 | Mulholland | G06F 3/0671 |
| 2021/0318824 A1 * | 10/2021 | Cain | G06F 3/0644 |
| 2023/0072553 A1 * | 3/2023 | Karri | G06T 19/20 |

OTHER PUBLICATIONS

Chiang, R.C., et al., "An Adaptive IO Prefetching Approach for Virtualized Data Centers," IEEE Transactions on Services Computing, 2015, https://www2.seas.gwu.edu/~howie/publications/SCC15.pdf.

(Continued)

*Primary Examiner* — Kaushikkumar M Patel
(74) *Attorney, Agent, or Firm* — Kilpatrick Townsend & Stockton LLP

(57) ABSTRACT

A container image can be used to determine a caching algorithm for a software application. For example, a storage system can receive a context tag indicating an input/output (IO) pattern associated with a software application of a container. The context tag can be determined based on a container image of the container. The storage system can determine a caching algorithm for the software application based on the context tag. The storage system can apply the caching algorithm to the software application.

15 Claims, 4 Drawing Sheets

(56) References Cited

OTHER PUBLICATIONS

Matsuzawa, K., et al., "VM-Aware Adaptive Storage Cache Prefetching," IEEE 9th International Conference on Cloud Computing Techology and Science, 2017, https://ieeexplore.ieee.org/abstract/document/8241092.

Soundararajan, G., et al., "Context-Aware Prefetching at the Storage Server," USENIX Annual Technical Conference, 2008, https://www.usenix.org/legacy/event/usenix08/tech/full_papers/soundararajan/soundararajan.pdf.

\* cited by examiner

USING A CONTAINER IMAGE TO DETERMINE A CACHING ALGORITHM FOR A SOFTWARE APPLICATION

TECHNICAL FIELD

The present disclosure relates generally to data management. More specifically, but not by way of limitation, this disclosure relates to using a container image to determine a caching algorithm for a software application.

BACKGROUND

Containers are relatively isolated virtual-environments that are typically deployed from image files, which are referred to herein as container images. A container image can be a static binary file that includes all of the requirements for running a container. Container images can include a compiled version of a software application as well as system libraries and operating system settings. Data for the software application can be read from and written to a storage system, which may include one or more storage devices. Examples of storage devices include hard disk drives, caches, and solid state drives. Caches may have a relatively low latency compared to drives and may be non-volatile (i.e., a cache can retain its data when powered off). Reading and writing data to a cache may be faster and less computationally expensive than reading and writing data to a drive.

DETAILED DESCRIPTION

Caching algorithms can be used to manage data in a storage system. A caching algorithm can define how data is to be stored in and removed from a cache of the storage system. A particular caching algorithm may be best suited for a particular IO pattern of a software application. For example, a caching algorithm of prefetching one data unit at a time for the software application may be suited for a semi-random access IO pattern. But, the storage system may not be able to identify a most-appropriate caching algorithm from code of the software application. As a result, data for the software application may be managed sub-optimally by the storage system, which can result in reduced performance of the storage system and the software application.

Some examples of the present disclosure overcome one or more of the abovementioned problems by providing a system that can identify an IO pattern for software applications that do not include the code for indicating the IO pattern to a storage system and that can indicate the IO pattern to the storage system. The system can analyze a container image of a container that includes a software application to identify the software application. The system can then determine the IO pattern for the software application and indicate the IO pattern to the storage system. For example, the system can include a context tag indicating the IO pattern with an IO request sent to the storage system. A caching algorithm for the software application can be determined based on the IO pattern and the caching algorithm can then be applied for storing data of the software application in a cache.

As a more specific example, a scheduler of a management node can analyze an image signature of a container image. The container image can be usable to build a container with software application A. The scheduler can determine the image signature indicates that the container includes software application A. A scheduler can perform a lookup of a table to determine that the IO pattern for software application A is sequential access. The scheduler can send an IO request for a data unit of software application A to a storage system. The IO request can include a context tag indicating that the IO pattern is sequential access. Based on the IO pattern, the storage system can then determine that the caching algorithm is to involve prefetching ten data units at a time and storing the data units in a cache for one minute each. The storage system can then apply the caching algorithm for software application A.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
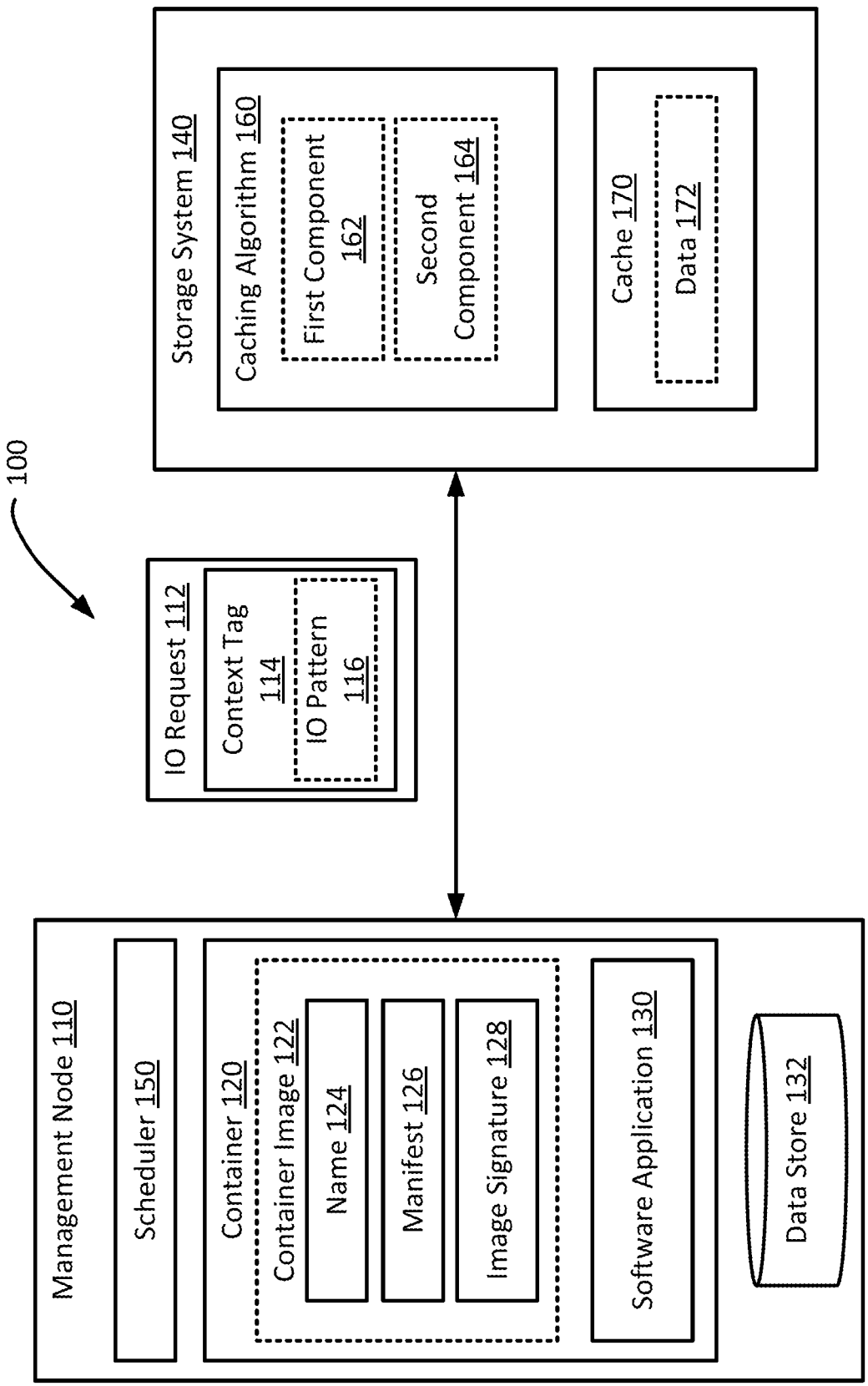
FIG. 1 is a block diagram of an example of a system for implementing using a container image to determine a caching algorithm for a software application according to some aspects of the present disclosure.

FIG. 1 is a block diagram of an example of a system 100 for implementing using a container image 122 to determine a caching algorithm 160 for a software application 130 according to some aspects of the present disclosure. The system 100 can include a management node 110 and a storage system 140, which can communicate with one another via a network, such as a local area network (LAN) or the Internet. The management node 110 and the storage system 140 may be part of a container-orchestration system, such as Kubernetes. In such examples, a scheduler 150 of the management node 110 can be a kubelet.

In some examples, the scheduler 150 can execute a container 120 that includes a software application 130. The container 120 can be deployed from a container image 122 that includes a compiled version of a software application 130 as well as system libraries and operating system settings. The container 120 is illustrated as including the container image 122, but the container 120 may be built from the container image 122 and not include the container image 122. It may be beneficial to store data 172 associated with the software application 130 in a cache 170 of the storage system 140. Additionally, determining an appropriate caching algorithm for the software application 130 can ensure that the system 100 manages the data 172 for the software application 130 efficiently.

To determine a caching algorithm 160 for the software application 130, the scheduler 150 can analyze the container image 122 to identify the software application 130. For example, the scheduler 150 may inspect a name 124 of the container image 122 and a manifest 126 associated with the container image 122. The name 124 may include an indication of a name of the software application 130, from which the scheduler 150 can determine the software application 130 of the container 120. The manifest 126 can provide information about layers and architectures of the container image 122, which can further be used to identify the software application 130. The scheduler 150 may additionally or alternatively use an image signature 128 of the container image 122 to determine the software application 130. The image signature 128 can be used to determine where the container image 122 came from and to check that the container image 122 has not been tampered with prior to running the container 120. The image signature 128 can be generated by applying a hashing algorithm, such as a secure-hash algorithm (SHA) or a message-digest (MD) algorithm, for the container image 122. The scheduler 150 can access a data store 132 of image signatures and associated software applications to determine that the image signature 128 is associated with the software application 130. The scheduler 150 may use binaries included in content of the container image 122 to identify the software application 130. As another example, the scheduler 150 may use a machine-learning model trained on historical container images and associated software applications to determine that the software application 130 is associated with the container image 122.

Upon identifying the software application 130, the scheduler 150 can determine an IO pattern 116 for the software application 130. Examples of the 10 pattern 116 can be sequential access, semi-sequential access, random access, and semi-random access. To determine the IO pattern 116, the scheduler 150 can perform a lookup of a table that stores indications of software applications and associated 10 patterns. The table can be part of the data store 132. The IO patterns for the software applications can be determined from a previous execution of the software applications. For example, the software application 130 may have previously been executed by the scheduler 150. During the execution of the software application 130, the scheduler 150 can determine the IO pattern 116 for the software application 130. Subsequent to the execution of the software application 130, the scheduler 150 can store an indication of the IO pattern 116 in the data store 132.

In some examples, the storage system 140 can receive an IO request 112 that includes a context tag 114 indicating the IO pattern 116 for the software application 130. The context tag 114 can be added to the IO request 112 by the scheduler 150 or another component of the management node 110. Based on the context tag 114, the storage system 140 can determine the caching algorithm 160 for the software application 130. For example, if the context tag 114 indicates that the 10 pattern 116 is sequential access, the storage system 140 may determine that the caching algorithm 160 is to involve aggressively prefetching the data 172 for the software application 130. Aggressively prefetching the data 172 may involve predicting and storing multiple data units in the cache 170 prior to an IO request for the data units. In another example, if the context tag 114 indicates that the IO pattern 116 is semi-random access, the storage system 140 may determine that the caching algorithm 160 is to involve prefetching the data 172 one data unit at a time for the software application 130. Other caching algorithms that the storage system 140 may use for the caching algorithm 160 can involve not storing the data 172 in the cache 170, a least frequently used algorithm for the data 172 in the cache 170, or any other suitable caching algorithm.

The caching algorithm 160 may include one or more components associated with different aspects of storing the data 172 in the cache 170. For example, a first component 162 of the caching algorithm 160 may be associated with prefetching the data 172 for the software application 130, and a second component 164 of the caching algorithm 160 may be associated with a time length for storing the data 172 for the software application 130 in the cache 170. The first component 162 of the prefetching may involve a number of data units that are to be prefetched and stored in the cache 170 at any particular time. The first component 162 and the second component 164 of the caching algorithm 160 can be determined based on the IO pattern 116 of the software application 130.

Upon determining the caching algorithm 160 that is to be applied for the software application 130, the storage system 140 can apply the caching algorithm 160 to the software application 130. Applying the caching algorithm 160 can involve storing the data 172 for the software application 130 in the cache 170 based on the caching algorithm 160. For example, the storage system 140 can store a number of data units for the software application 130 for a length of time as indicated by the caching algorithm 160.

While the example shown in FIG. 1 depicts a specific number and arrangement of components for simplicity, other examples may include more components, fewer components, different components, or a different arrangement of the components shown in FIG. 1. For example, although the management node 110 in FIG. 1 is illustrated as running one container with one software application, other examples may include a larger number of containers with one or more software applications. Additionally, while the management node 110 is illustrated as including the data store 132, the data store 132 may be remote from and accessible by the management node 110 in other examples. The storage system 140 can determine a caching algorithm for each software application based on a container image of their containers. The caching algorithm applied for one software application can differ from a caching algorithm applied for another software application.

Figure 2:
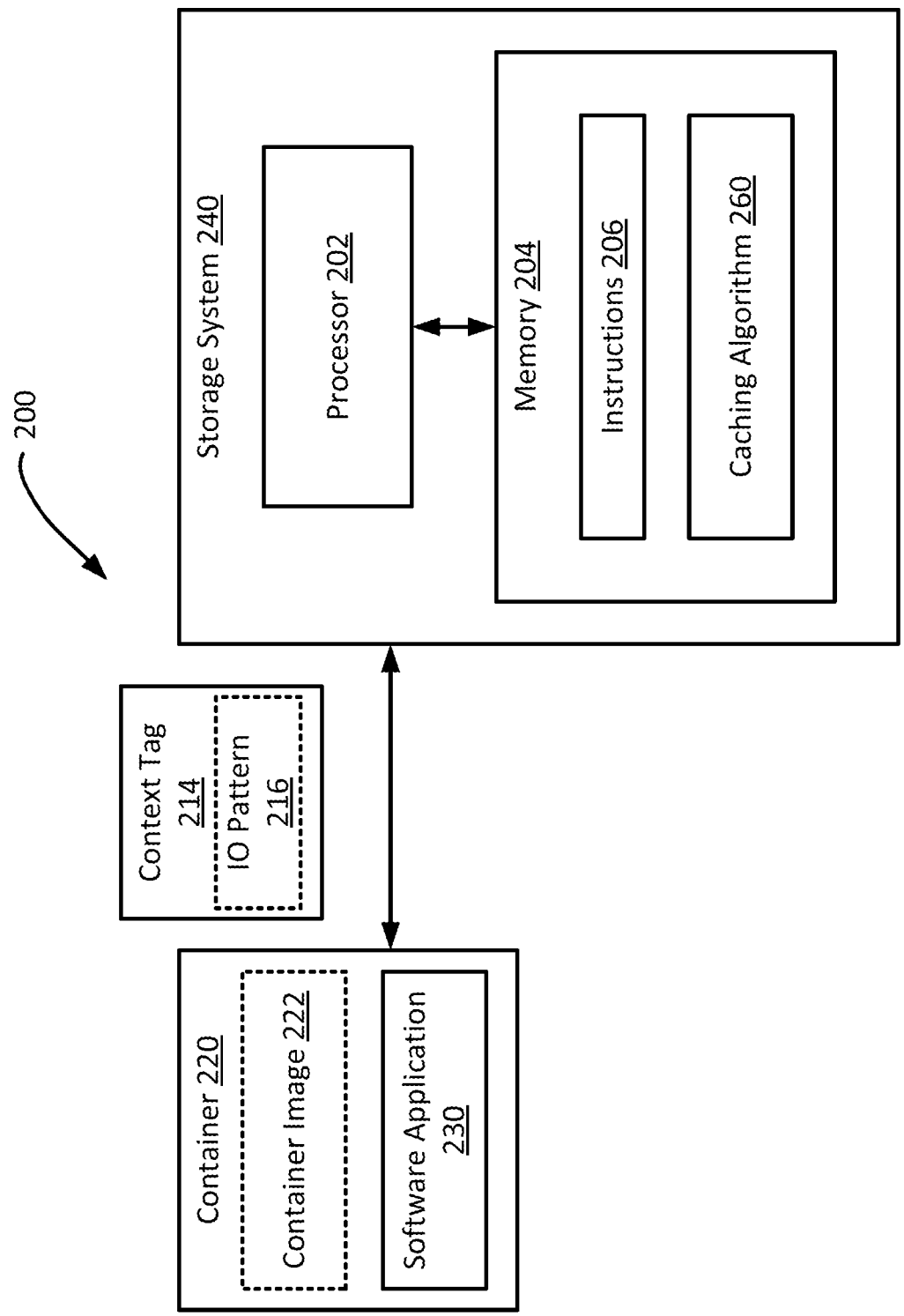
FIG. 2 is a block diagram of another example of a system for implementing using a container image to determine a caching algorithm for a software application according to some aspects of the present disclosure.

FIG. 2 is a block diagram of another example of a system for implementing using a container image to determine a caching algorithm for a software application according to some aspects of the present disclosure. The system 200 includes a processor 202 communicatively coupled with a memory 204. In some examples, the processor 202 and the memory 204 can be part of a system, such as the storage system 140 of FIG. 1.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. In some examples, the instructions 206 can include processor-specific instructions generated by a compiler or an interpreter from code written in any suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. In some examples, at least some of the memory can include a medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

In some examples, the processor 202 can execute instructions 206 to perform various operations. For example, the processor 202 can receive, by a storage system 240, a context tag 214 indicating an IO pattern 216 associated with a software application 230 of a container 220. The context tag 214 can be determined based on a container image 222 of the container 220. For example, a name and manifest or an image signature of the container image 222 may be used to identify the software application 230. The processor 202 can perform a lookup of a table storing indications of software applications and associated IO patterns based on prior executions of the software applications to determine the IO pattern 216. The processor 202 can determine a caching algorithm 260 for the software application 230 based on the context tag 214. The caching algorithm 260 may involve a prefetching component and a time-length component for storing data for the software application 130 in a cache of the storage system 240. For example, the processor 202 may determine that the caching algorithm 260 is to involve prefetching one data unit at a time and maintaining the data unit in the cache for one minute. The processor 202 can then apply the caching algorithm 260 to the software application 230. The processor 202 can store data for the software application 230 in the cache according to the caching algorithm 260. As a result, an appropriate caching algorithm can be determined for software applications that are not capable of indicating their IO pattern to a storage system, thereby improving performance of the storage system and the software application.

Figure 3:
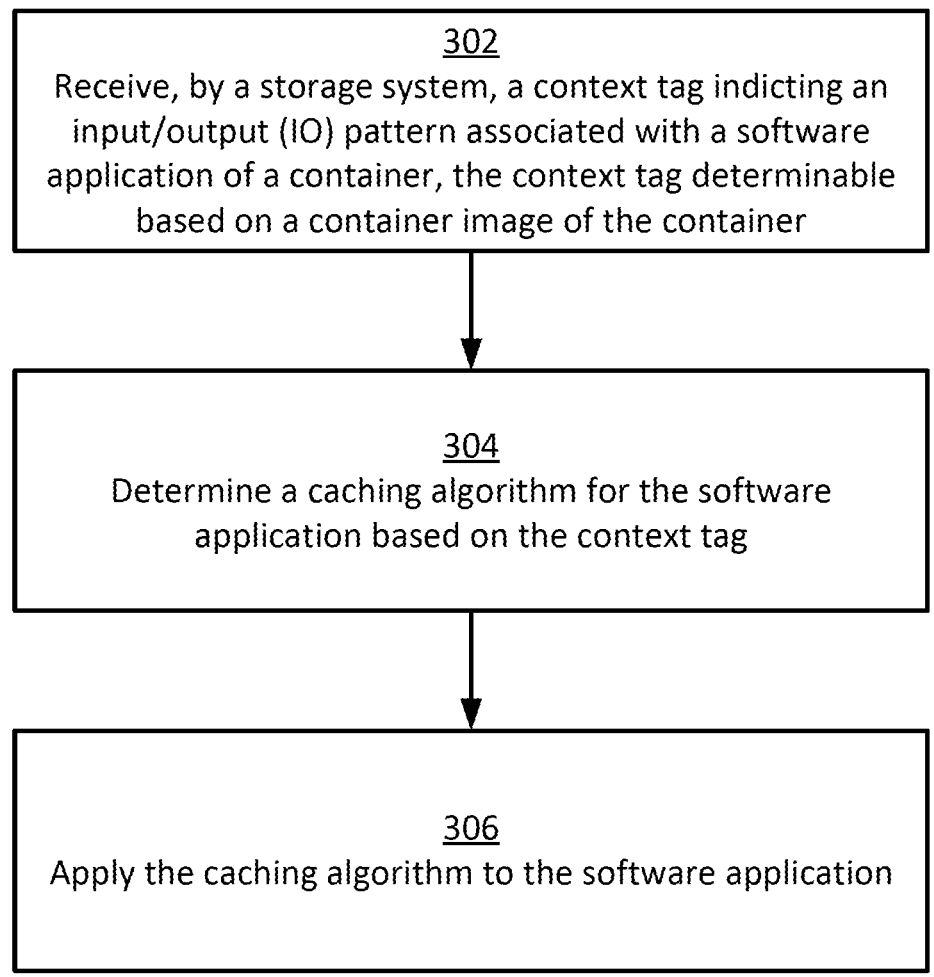
FIG. 3 is a flow chart of an example of a process for using a container image to determine a caching algorithm for a software application according to some aspects of the present disclosure.

FIG. 3 is a flow chart of an example of a process for using a container image to determine a caching algorithm for a software application according to some aspects of the present disclosure. In some examples, the processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, the processor 202 receives, by a storage system 240, a context tag 214 indicating an IO pattern 216 associated with a software application 230 of a container 220. The context tag 214 can be determined based on a container image 222 of the container 220. A scheduler of a management node of the system 200 may determine the context tag 214. To determine the context tag 214, the scheduler can identify the software application 230. To identify the software application 230, the scheduler can analyze a name and a manifest of the container image 222, analyze an image signature of the container image 222, analyze binaries of content of the container image 222, or input the container image 222 into a machine learning model. The scheduler can then lookup the IO pattern 216 in a table that stores indications of software applications and associated IO patterns. Upon identifying the IO pattern 216, the scheduler can add the context tag 214 to each IO request associated with the software application 230.

In block 304, the processor 202 determines a caching algorithm 260 for the software application 230 based on the context tag 214. For example, if the context tag 214 indicates that the IO pattern 216 is sequential access, the processor 202 may determine that the caching algorithm 260 is to involve aggressively prefetching the data for the software application 230, where aggressive prefetching involves predicting and storing multiple data units in a cache prior to an IO request for the data units. Alternatively, if the context tag 214 indicates that the IO pattern 216 is semi-random access, the processor 202 may determine that the caching algorithm 260 is to involve prefetching data one data unit at a time for the software application 230. Other caching algorithms that the processor 202 may use for the caching algorithm 260 can involve not storing data in the cache, a least frequently used algorithm for maintaining data in the cache, or any other suitable caching algorithm. In addition, the caching algorithm 260 may include one or more components associated with different aspects of storing the data in the cache 170. For example, a first component of the caching algorithm 260 may be associated with prefetching the data for the software application 230, and a second component of the caching algorithm 260 may be associated with a time length for storing the data for the software application 230 in the cache 170.

In block 306, the processor 202 applies the caching algorithm 260 to the software application 230. For example, the processor 202 may determine that the IO pattern 216 for the software application 230 is semi-random access and that the caching algorithm 260 involves prefetching and storing one data unit in the cache at a time. Upon receiving an IO request for the software application 230, the processor 202 can predict a data unit associated with a subsequent IO request and store the data unit in the cache. The data unit can be maintained in the cache for the time length specified by the caching algorithm 260.

Figure 4:
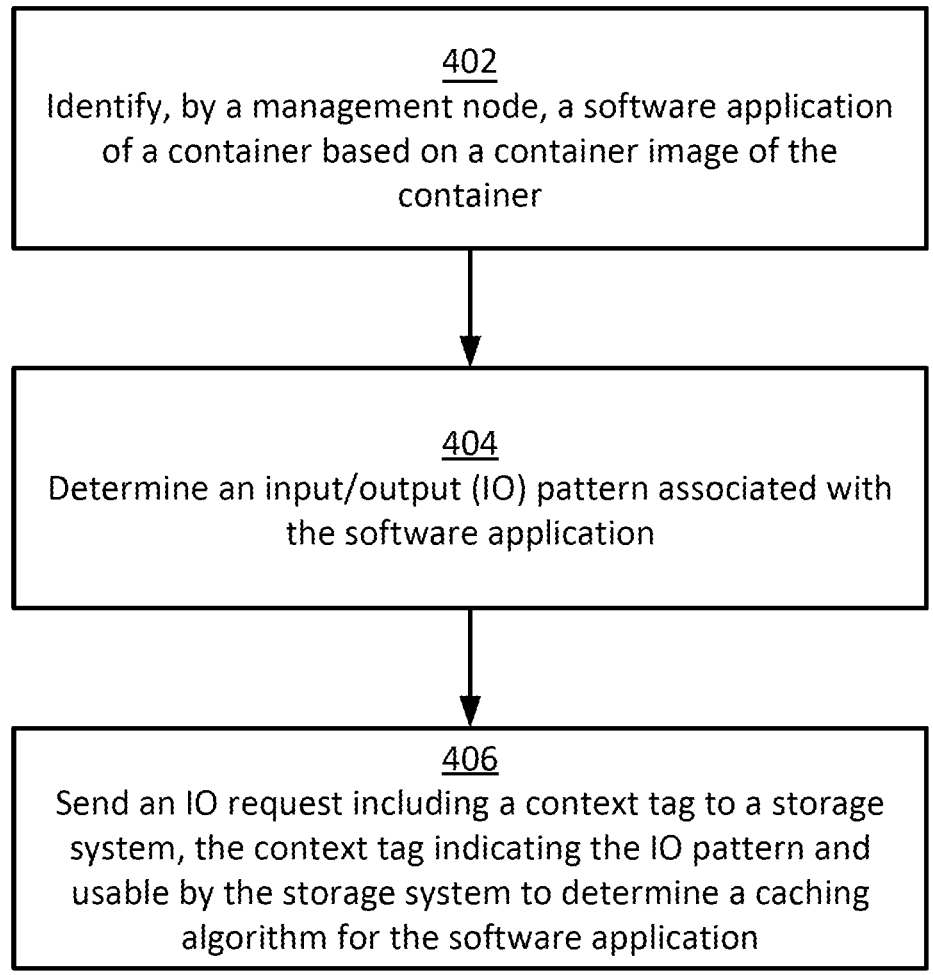
FIG. 4 is a flow chart of another example of a process for using a container image to determine a caching algorithm for a software application according to some aspects of the present disclosure.

FIG. 4 is a flow chart of another example of a process for using a container image to determine a caching algorithm for a software application according to some aspects of the present disclosure. In some examples, a processor can implement some or all of the steps shown in FIG. 4. The processor can be part of a management node, such as the management node 110 in FIG. 1. Other examples can include more steps, fewer steps, different steps, or a different order of the steps than is shown in FIG. 4.

In block 402, a processor identifies, by a management node, a software application of a container based on a container image of the container. The processor can analyze a name and a manifest of the container image to identify the software application. Additionally or alternatively, the processor may analyze an image signature of the container image to identify the software application. The processor may access a data store of image signatures and associated software applications to determine the software application associated with the image signature. In some examples, the processor may use binaries included in content of the container image to identify the software application.

In block 404, the processor determines an IO pattern associated with the software application. Examples of the IO pattern can be sequential access, semi-sequential access, random access, and semi-random access. To determine the IO pattern, the processor can perform a lookup of a table storing indications of software applications and associated IO patterns. The IO patterns for the software applications can be determined from a previous execution of the software applications. For example, the software application may have previously been executed by the processor, during which the processor determined the IO pattern. Subsequent to the execution of the software application, the processor can have stored an indication of the IO pattern in the table.

In block 406, the processor sends an IO request including a context tag to a storage system. The context tag can indicate the IO pattern and can be usable by the storage system to determine a caching algorithm. A different caching algorithm may be determined for different IO patterns. In some examples, the caching algorithm may include one or more components associated with different aspects of storing data for the software application in a cache. For example, a first component of the caching algorithm may be associated with prefetching the data for the software application, and a second component of the caching algorithm may be associated with a time length for storing the data for the software application in the cache. The first component and the second component of the caching algorithm can each be determined based on the IO pattern of the software application. The storage system can then apply the caching algorithm for the software application. For example, the storage system can prefetch data units and maintain the data units in the cache according to the caching algorithm. Analyzing the container image to identify the software application, determining the IO pattern, and indicating the IO pattern to the storage system can allow the storage system to apply an effective caching algorithm to the software application based on the IO pattern. As a result, performance of the software application and the storage system can be improved.

As one particular example, a scheduler can run a container with a software application that performs random access for reading data that is stored in a storage system. To access the data quickly, a cache of the storage system may be used to store one or more data units, since a cache can provide data more quickly than a hard disk drive or a solid state drive of the storage system. A number of data units that are to be stored in the cache and a length of time for maintaining the data units in the cache can be specified by a caching algorithm. The caching algorithm can be determined based on a context tag associated with an IO request for the software application.

Without knowing which software application is associated with the container, the scheduler may not know which context tag to include with the IO request. To determine the context tag, the scheduler can initially access a container image associated with the container to identify the software application. The scheduler can identify an image signature of the container image and perform a lookup of a data store to determine that the image signature corresponds to the software application. Once the scheduler identifies the software application, the scheduler can perform another lookup of a table to determine that an IO pattern for the software application is random access. The table may be stored in the same data store as the association of the image signature and the software application. Based on the IO pattern, the scheduler can determine that the context tag is to indicate that the software application performs random access. The storage system can then determine, based on the context tag indicating the software application performs random access, that no data units for the software application are to be stored in the cache since subsequent data units of subsequent IO may be difficult to predict. Therefore, the cache space can be saved for other software applications that are associated with other IO patterns, where it may be more beneficial and easier to predict data units for prefetching and storing in the cache.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
a processor; and
a memory including instructions that are executable by the processor for causing the processor to:
  execute a software application;
  determine an input/output (IO) pattern for the software application in response to executing the software application;
  store an indication of the IO pattern in a data store;
  subsequent to storing the indication of the IO pattern:
    receive, by a storage system, a context tag indicating the IO pattern associated with the software application of a container, the context tag determinable by a scheduler of a management node based on a container image of the container and a lookup of the data store that stores indications of software applications and associated IO patterns, the scheduler being configured to identify the software application by inputting the container image into a machine learning model;
    determine a caching algorithm for the software application based on the context tag; and
    store a number of data units for the software application in a cache of the storage system for a time length by applying the caching algorithm to the software application.

2. The system of claim 1, wherein the scheduler is further configured to identify the software application by:
  receiving the container image; and
  determining a name and a manifest of the container image.

3. The system of claim 1, wherein the scheduler is further configured to identify the software application by:
  receiving the container image; and
  analyzing an image signature of the container image.

4. The system of claim 1, wherein the memory further includes instructions that are executable by the processor for causing the processor to:
  receive, by the storage system, the context tag with an IO request for the software application.

5. The system of claim 1, wherein the caching algorithm comprises a first component associated with prefetching data for the software application and a second component associated with the time length for storing the data for the software application in the cache.

6. The system of claim 1, wherein the scheduler is further configured to identify the software application by analyzing binaries included in content of the container image.

7. A method comprising:
  executing a software application;
  determining an input/output (IO) pattern for the software application in response to executing the software application;
  storing an indication of the IO pattern in a data store;
  subsequent to storing the indication of the IO pattern:
    identifying, by a management node, the software application being included in a container based on a container image of the container by inputting the container image into a machine learning model;
    determining the IO pattern associated with the software application based on a lookup of the data store that stores indications of software applications and associated IO patterns; and sending an IO request including a context tag to a storage system, the context tag indicating the IO pattern and usable by the storage system to determine a caching algorithm for the software application, the caching algorithm usable by the storage system to store a number of data units for the software application in a cache of the storage system for a time length.

8. The method of claim 7, further comprising determining the software application by:
receiving the container image; and
determining a name and a manifest of the container image.

9. The method of claim 7, further comprising determining the software application by:
receiving the container image; and
analyzing an image signature of the container image.

10. The method of claim 7, wherein the caching algorithm comprises a first component associated with prefetching data for the software application and a second component associated with the time length for storing the data for the software application in the cache.

11. A non-transitory computer-readable medium comprising program code that is executable by a processor for causing the processor to:
execute a software application;
determine an input/output (IO) pattern for the software application in response to executing the software application;
store an indication of the IO pattern in a data store;
subsequent to storing the indication of the IO pattern:
receive, by a storage system, a context tag indicating the IO pattern associated with the software application of a container, the context tag determinable by a scheduler of a management node based on a container image of the container and a lookup of the data store that stores indications of software applications and associated IO patterns, the scheduler being configured to identify the software application by inputting the container image into a machine learning model;
determine a caching algorithm for the software application based on the context tag; and
store a number of data units for the software application in a cache of the storage system for a time length by applying the caching algorithm to the software application.

12. The non-transitory computer-readable medium of claim 11, further comprising program code that is executable by the processor for causing the processor to receive the context tag subsequent to the scheduler identifying the software application, wherein the scheduler is further configured to identify the software application by:
receiving the container image; and
determining a name and a manifest of the container image.

13. The non-transitory computer-readable medium of claim 11, further comprising program code that is executable by the processor for causing the processor to receive the context tag subsequent to the scheduler identifying the software application, wherein the scheduler is further configured to identify the software application by:
receiving the container image; and
analyzing an image signature of the container image.

14. The non-transitory computer-readable medium of claim 11, further comprising program code that is executable by the processor for causing the processor to:
receive, by the storage system, the context tag with an IO request for the software application.

15. The non-transitory computer-readable medium of claim 11, wherein the caching algorithm comprises a first component associated with prefetching data for the software application and a second component associated with the time length for storing the data for the software application in the cache.

\* \* \* \* \*